United States Patent [19]

Foran, Jr.

[11] Patent Number: 5,259,244
[45] Date of Patent: Nov. 9, 1993

[54] SINEWAVE FLOWMETER

[76] Inventor: Charles D. Foran, Jr., 2810 Ambleside La., Richardson, Tex. 75082

[21] Appl. No.: 671,461

[22] Filed: Mar. 19, 1991

[51] Int. Cl.$^5$ ............................................... G01F 3/08
[52] U.S. Cl. ...................................................... 73/253
[58] Field of Search ............... 73/253, 239, 259, 260, 73/261; 418/216, 217, 219

[56] References Cited

U.S. PATENT DOCUMENTS

| | | | |
|---|---|---|---|
| 25,948 | 11/1859 | Burnell . | |
| 638,458 | 12/1899 | Hinman . | |
| 825,324 | 7/1906 | Jones . | |
| 1,035,225 | 8/1912 | Nuebling . | |
| 1,690,727 | 11/1928 | Jaworowski | 418/216 |
| 2,154,458 | 4/1939 | Knapp | 73/259 X |
| 2,636,479 | 4/1953 | Smyser . | |
| 4,575,324 | 3/1986 | Sommer et al. . | |
| 4,646,568 | 3/1987 | Lew | 73/260 |

FOREIGN PATENT DOCUMENTS 13992  2/1990  United Kingdom ................. 418/216

OTHER PUBLICATIONS

Sine Pump Data Sheet SPS/23.

*Primary Examiner*—Herbert Goldstein
*Attorney, Agent, or Firm*—James Creighton Wray

[57] ABSTRACT

A flowmeter has two moving parts, a rotor with a cylindrical core and the radially extending sinusoidal curving vane. A slider has a gate opening which fits on the vane for reciprocating axially as the rotor turns. The slider and rotor are held within a cavity and slider recess within a case. Fluid is admitted through an inlet opening on one side of the slider and is exhausted through an outlet opening on the other side of the slider. A magnetic pickup on the slider indicates the movements of the slider, and hence the rotation of the rotor and the volume of fluid flowing through the meter.

15 Claims, 1 Drawing Sheet

SINEWAVE FLOWMETER

BACKGROUND OF THE INVENTION

Flowmeters of many different kinds are used to measure fluid flow rates and volumes. Particular flowmeters are selected for ranges of measurements and accuracies. Flowmeters vary from water meters to additive meters and paint meters, which measure, for example, the exact amount of paint which is applied to an automobile body.

Typical flowmeter categories are mass, velocity, displacement and pressure differential meters. Within each category different types of flowmeters exist. Displacement meters include piston, gear, oral gear disc and vane meters.

In positive displacement flowmeters, which have motion, the force of moving meter elements is usually provided by the fluid which flows through the meter. Accuracy and sensitivity to flows over wide ranges are the hallmarks of good flowmeters.

Work continues on improving flowmeters and providing flowmeters of simplified designs which reduce complexity in their component parts, which reduce weight of component parts and which are highly sensitive and quickly start and stop or change speed according to changes in flow volumes.

SUMMARY OF THE INVENTION

The present invention is directed to furthering the improvement of flowmeters, and particularly positive displacement flowmeters.

The present invention provides a flowmeter with a single rotor having a curved axial vane or wall which rotates in a cylindrical cavity. A slider moves back and forth with the vane to separate the inlet and outlet openings, which are on opposite sides of the slider.

The vane may have any curved shape which is suitable to move the slider. For example, the vane may form one complete sign wave on the circumference of the core. Alternatively, the vane may form two or more complete sign waves.

In one preferred embodiment of the invention, a sinusoidal rotor has two complete sinusoidal curves, which define four separate fluid measuring compartments bounded by the rotor core and vane and the cavity inner radial side walls and circumferential wall of the housing or case. As the rotor turns, the inlet is filling one or two chambers, while the outlet is emptying one or two chambers. There are always two full chambers moving through the flowmeter.

The sinusoidal rotor is driven by the pressure differential between the inlet and outlet, or force of the incoming fluid, flowing into the inlet. A volume of fluid is trapped in each of the four separate measuring compartments as the rotor. The rotor turns until the place where the vane passes the outlet. The vane passes through the slider gate, which usually divides two of the compartments, making four partial compartments as well as the two full compartments. The inlet and outlet are preferably two large ports extending across the cavity at about 90° from each other on opposite sides of the slider. The slider ensures the passage of fluid out through the outlet and prevents fluid from returning to the inlet. The fluid therefore must exit the outlet. Each turn of the rotor measures four complete volumes. Counting is accomplished by one of several methods. In one method an output shaft is directly connected to the rotor. The output shaft works in conjunction with a frequency sensor and transmitter. In other embodiments, magnets are placed on the slider or on the vane or on the rotor, and a hall effect sensor on the non-magnetic case senses relative movement of the slider, vane or rotor.

By knowing the volume of fluid in each of the four compartments, each rotation of the rotor corresponds to a known volume.

Flow rate = rpm × volume/revolutions

In one way of counting, targets are mounted in the upper edge of the scraper. Each excursion of the scraper measures one volume of one compartment. The targets pass back and forth and can be counted by any of one or several sensors, such as proximity switches, magnetic pickups, photoelectric or optical sensors. The number of targets counted would be directly proportional to the fluid flow.

Flow rate = pulses/unit of time × volume/pulse

Total flow = pulses × volume/pulse

A preferred flowmeter has a case with a cavity enclosing a rotor having a core and a vane or wall extending radially outward from a core and forming a sinusoidal junction at the base of the wall with the core. The wall terminates outward in a sinusoidal shape lying in the cylinder. The preferred case has a cylindrical cavity for abutting the lateral and radial outer surfaces of the wall. The cavity may be formed in the shape of any body of revolution about the axis, and the radial wall. The body of revolution may be a sphere, ovoid, cone, cylinder or any other shape suitable for sealing by receiving a rotor and vane. The vane is shaped to match the cavity.

An inlet and an outlet extend through the case on opposite sides of the slider and open into the cavity for communicating with compartments on both sides of the vane. Preferably the inlet and outlet have single large ports extending through the cylindrical wall. Each of the inlet and outlet may be divided into two ports near or in the axial walls of the cavity near the slider. A slider is positioned in the case for sliding axially with respect to the core. The slider has a gate opening through which the wall passes. The inlet and outlet openings are on opposite sides of the slider. An indicator connected to the slider or to the rotor indicates movement of the wall and thereby indicating volume of fluid passing from the inlet to the outlet.

A preferred indicator includes a magnet connected to the slider and a hall effect sensor mounted on the case near the slider for sensing movement of the magnet. Another indicator includes a magnet mounted on the rotor and a hall effect sensor mounted on the case near the rotor for sensing passage of the magnet. In the latter case, the magnet is mounted on a radially outer surface of the wall, laterally on the wall in an axial direction of the core. The indicator may use a magnet mounted on the core. Magnets may be mounted in sides of the rotor, and a pickup may be mounted on the case. The rotor may be hollow with a rotatable shaft extending through or into the rotor and being magnetically coupled for rotation with the rotor.

In one embodiment, the flowmeter has an axial extension on the core, and an indicator is mounted on the axial extension. An optical pickup reads the indicator.

A preferred flowmeter has a case having a cylindrical cavity. An axial slot communicates with the cylindrical cavity. An inlet and an outlet extend through the case and respectively open into the cavity on opposite sides of the slot and extend across the cavity. A rotor mounted in the cavity has a cylindrical core with a cylindrical outer surface. A curved vane extends between side walls of the cavity and radially extends outward from the outer surface of the core to the axial wall of the cavity. A slider is positioned in the slot. The slider has a slider gate opening for passing the vane through the opening. An internal surface of the slider is positioned along the cylindrical surface of the core. An indicator is connected to one of the slider and the rotor for indicating movement, thereby indicating volume of fluid flowing between the inlet and the outlet.

The inlet and outlet may take any suitable form. In a preferred embodiment, the inlet and outlet lead through the casings into first and second generally round openings in the cavity on first and second opposite sides of the slider.

The volume per revolution may be measured by measuring the volume of the cavity and subtracting the displacement volume of the rotor, which includes the core and vane or wall which move within the cavity, and the displacement volume of a slider within the cavity.

The housing rotor and slider may be made of any suitable material such as, for example, plastic or stainless steel. When a magnetic indicator is used, the case, rotor vane and slider may be made of non-magnetic plastic material and indicators on one or more the moving parts may be made of permeable ferrous, nickel, cobalt or other magnetic material. Alternatively, the case and the moving parts, the rotor and the slider may be made of non-magnetic material, and magnets may be inserted in one or both of the moving parts, and hall effect sensors may be mounted on the case.

A preferred simplified version of the invention has a cylindrical cavity formed in a single plastic case part, and a cover which is secured to the first part to close the cavity. The cavity and cover have aligned slide receivers for receiving the slide.

Before the cover is connected to the first case part, the slide is positioned on the rotor with the gate opening receiving the vane. Then the rotor is positioned in the cavity, with the slide aligning with the slide receivers in the first case part and the cover. The cavity part of the case and the cover are then bolted together.

In one modification the core may be fixed and the sinusoidal vane may freely slide between the fixed core and the case.

In most cases, and especially in applications in which the meter is used with non-lubricating fluids, the case rotor and slide are made preferably from self-lubricating materials. Small controlled clearances are provided between the axial end walls of the core and the cavity, and between the axial side walls of the vane and the cavity, and between the outer edge of the vane and the cylindrical wall of the cavity, between the vane and the gate opening of the slider, and between the slider and the slider receivers in the case.

In a preferred embodiment, paper-thin bosses on ends of the core space ends of the core from the flat walls of the cavity. The bosses may be formed integrally with the core or case.

In a preferred embodiment, the meter is bearingless. The rotor may float within the cavity. In one embodiment, stub axles on the rotor core extend into openings in the side walls of the cavities.

Alternatively, the core may be extended into complementary formed openings in the cavity.

In one embodiment, the core is hollow and contains magnetic coupling elements. A hollow portion of the casing extends into the core, and a shaft with magnetic coupling elements extends into the hollow shaft of the casing for coupling the rotor to an optically readable indicator.

In one preferred form of the invention, a magnet is positioned in the radially outward wall of the slider, and a hall effect sensor is connected to the case in a position to intercept shifting magnetic fields produced by the magnet as the slider moves back and forth in the slider guideway receivers.

In a preferred embodiment, the inlet and outlet openings in the cavity comprise circular, rectangular or other shaped openings on opposite sides of the slider receiver. The openings deliver and receive fluid on both sides of the vane.

The meter is reversible. Flow may be reversed without changing measurement accuracy.

In a preferred embodiment, vane side walls are parallel and are perpendicular or radial to the cylindrical surfaces of the cavity and core. In one preferred embodiment, the vane walls may slope, for example, axially outward and radially inward commensurate with sloped openings in the slider gate.

These and further and other objects and features of the invention are apparent in the disclosure, which includes the above and ongoing written specification, with the claims and the drawings.

DETAILED DESCRIPTION OF THE DRAWINGS

Figure 1:
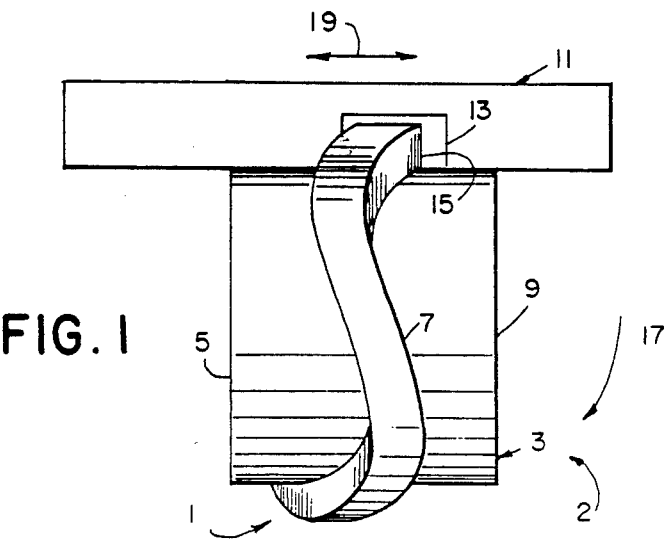
FIG. 1 is a schematic detail of the flowmeter operation.

FIG. 1 is a schematic representation of the moving parts generally indicated by the numeral 1 of a flowmeter 2 of the present invention. Rotor 3 includes a cylindrical core 5 and a serpentine vane 7. Axes 9 extend from the core. A slider 11 is mounted for reciprocating motion. A slider gate 13 within the slider 11 has a slider gate opening 15, which receives vane 7. As rotor 3 moves in the direction of uniform rotation represented by arrow 17, slider 11 reciprocates in the direction shown by arrows 19.

Figure 2:
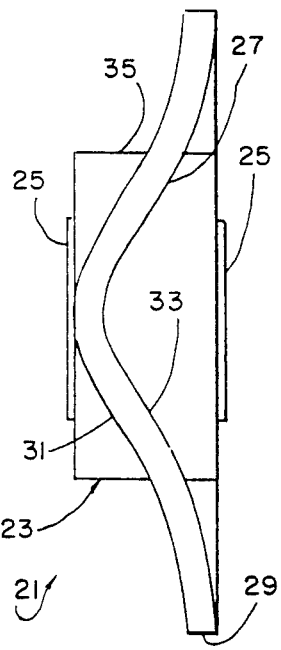
FIG. 2 is a side elevation of a preferred rotor.

As shown in FIG. 2, the rotor 21 has a core 23, with bosses 25 at its end to space the core from walls of the cavity in which the core rotates. A flange 27 has a serpentine cylindrical outer surface 29 and opposite faces 31 and 33, which are shown in projection. Sides 31 and 33 as shown in FIG. 2 are generally perpendicular to the cylindrical outer wall 35 of the core 23.

Figure 3:
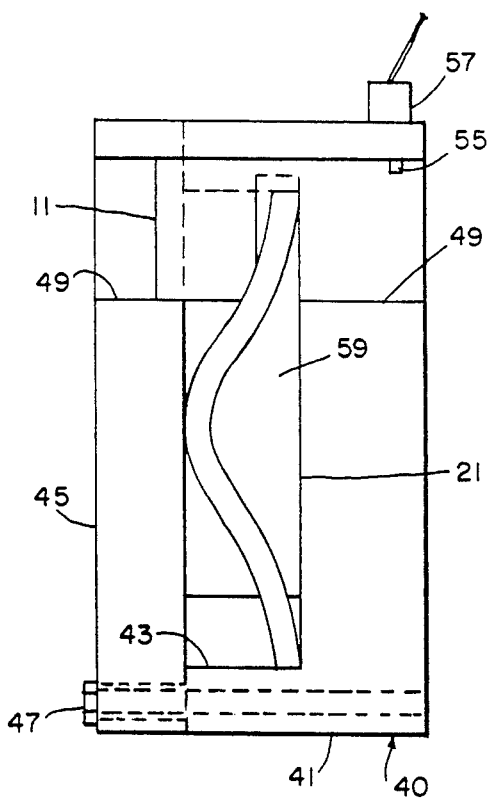
FIG. 3 is a schematic cross-sectional detail of the flowmeter.

As shown in FIG. 3, the case 40 has a first section 41 containing a cavity 43 and a second section 45, which is a cover. The sections are bolted together using conventional bolts 47. Both sections have recesses 49 for receiving the slide 11. The case is assembled by placing the slide 11 on the flange 27, and then placing the entire movable element assembly 1 in the cavity 43 and in the receiver slot 49 of the case section 41. The cover 45 is placed on the section 41, aligning the receiver slot 49 and the cover with the slider 11. The case sections are then bolted together using bolts 47.

Figure 4:
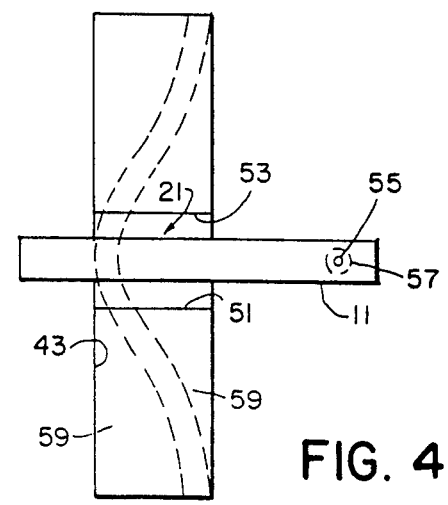
FIG. 4 is a schematic cross-sectional detail of the flowmeter showing the inlet and outlet openings and the outer edge of the slider.

As schematically shown in FIG. 4, slider 11 is positioned between inlet and outlet openings 51 and 53, which open into cavity 43 on opposite sides of the slider. The inlet and outlet openings are connected to inlet and outlet lines which extend through the case to couplings on the outside of the case.

In the embodiment shown in FIG. 4, the slider 11 is provided with a magnet 55. A hall effect pickup 57 is placed on the top of the case to indicate cycling passages of the magnet. In the embodiment shown, two cyclings of the magnet 55 noted by pickup 57 indicate one full rotation of the rotor 21 delivering four volumes 59 of fluid between the inlet and outlet.

In one embodiment, a fixed shaft is press-fit or formed in the rear wall of the case, and the cover has a blind bore which receives the shaft. The rotor has a pressed-in bearing insert which rotates on the shaft. In a preferred embodiment, the shaft is non-magnetic and hollow, and a first magnetic coupling in the bearing or rotor is coupled with a second magnetic bearing on an end of an indicator shaft which projects into the hollow fixed shaft. An indicator disc on the opposite end of the indicator shaft is optically read.

The slider may be spring mounted at ends to assist return of the slider toward the center. The curve of the vane may be a sine curve or any curve that effectively moves the slider. For example, the curve may have steeper central portions and more gradual outer portions to assist moving the slider near the extremities. The core and slider may have a coupling to assist driving of the slider. The slider movement may be magnetically assisted.

The invention a flowmeter with a single rotor having a curved axial vane or wall which rotates in a cylindrical cavity. The vane may form one complete sine wave on the core which establishes two volumes, or may also form two or complete sine waves, which define four separate fluid measuring compartments on the core. The sinusoidal vane and rotor are driven by the force of the incoming fluid flowing into the inlet. A volume of fluid is trapped in each of the separate measuring compartments as the rotor turns until the place where the vane passes the outlet. A slider gate on top of the rotor separates the inlet passage from the outlet passage. The vane passes through the slider gate, causing the slider to reciprocate across the rotor. Counting volumes is accomplished by several methods. In one method, an output shaft is directly connected to the rotor and works in conjunction with a frequency sensor. Other methods include magnets being placed on the slider, on the vane or on the rotor. A Hall effect sensor on the non-magnetic case senses relative movement of the slider, vane or rotor.

While the invention has been described with reference to specific embodiments, modifications and variations of the invention may be constructed without departing from the scope of the invention, which is defined in the following claims.

I claim:

1. A flowmeter comprising a case enclosing a cavity and a unitary rotor mounted in the cavity, the rotor having a core, a sinusoidal vane extending radially outward from the core and forming a sinusoidal junction at the base of the vane with the core, the vane terminating outward in a sinusoidal shape lying against an inner wall of the cavity, the vane having first and second opposite sides and the case having an inlet and outlet extending through the case and opening into the cavity for communicating with the opposite sides of the vane, and a slider positioned in the case for sliding axially in the case with respect to the core, the slider having a gate opening through which the vane passes, the inlet and the outlet opening into the cavity on opposite sides of the slider, and an indicator coupled to one end of the slider and the vane for indicating movement and thereby indicating volume of fluid passing from the inlet to the outlet.

2. The flowmeter of claim 1, wherein the indicator comprises a magnet connected to the slider and a hall effect sensor mounted on the case near the slider for sensing movement of the magnet and the slider.

3. The flowmeter of claim 1, wherein the indicator comprises a magnet mounted on the rotor and a hall effect sensor mounted on the case near the rotor for sensing passage of the magnet and rotation of the rotor.

4. The flowmeter of claim 3, wherein the magnet is mounted on a radially outer surface of the wall.

5. The flowmeter of claim 3, wherein the magnet is mounted laterally on the wall in an axial direction of the core.

6. The flowmeter of claim 1, wherein the indicator is mounted on the core.

7. The flowmeter of claim 1, further comprising an axial extension on the core and wherein the indicator is mounted on the axial extension.

8. The flowmeter of claim 1, further comprising an indicator shaft mounted on the case and magnetically coupled to the rotor for rotating with the rotor.

9. Flowmeter apparatus comprising a case having a cylindrical cavity, an axial slot communicating with the cylindrical cavity, and an inlet and outlet extending through the case and respectively opening into the cavity on opposite sides of the slot, a cylindrical unitary core with a cylindrical outer surface mounted axially in the cavity, a curved vane extending radially outward from the cylindrical outer surface of the core to the cylindrical cavity, a slider positioned in the slot, the slider having a slider gate opening for passing the vane through the opening, and the slider having an internal surface positioned along the cylindrical surface of the core, and an indicator coupled to one of the slider and the vane for indicating movement, and thereby indicating volume of fluid flowing between the inlet and the outlet.

10. The flowmeter of claim 9, wherein the indicator comprises a magnet connected to the slider and a hall effect sensor mounted on the case near the slider for sensing movement of the magnet.

11. The flowmeter of claim 9, wherein the indicator comprises a magnet mounted on the rotor and a hall effect sensor mounted on the case near the rotor for sensing passage of the magnet.

12. The flowmeter of claim 11, wherein the magnet is mounted on a radially outer surface of the wall.

13. The flowmeter of claim 11, wherein the magnet is mounted laterally on the wall in an axial direction of the core.

14. The flowmeter of claim 9, wherein the indicator is mounted on the core.

15. The flowmeter of claim 9, further comprising an axial extension on the core and wherein the indicator is mounted on the axial extension.

* * * * *